(12) United States Patent
Zhang et al.

(10) Patent No.: US 12,241,813 B2
(45) Date of Patent: Mar. 4, 2025

(54) ULTRAHIGH-TEMPERATURE WIND TUNNEL EROSION TESTING SYSTEM

(71) Applicant: EAST CHINA UNIVERSITY OF SCIENCE AND TECHNOLOGY, Shanghai (CN)

(72) Inventors: Xiancheng Zhang, Shanghai (CN); Liqiang Liu, Shanghai (CN); Jianping Tan, Shanghai (CN); Runzi Wang, Shanghai (CN); Shantung Tu, Shanghai (CN); Junmiao Shi, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 235 days.

(21) Appl. No.: 18/021,173

(22) PCT Filed: Aug. 4, 2022

(86) PCT No.: PCT/CN2022/110120
§ 371 (c)(1),
(2) Date: Feb. 13, 2023

(87) PCT Pub. No.: WO2023/011565
PCT Pub. Date: Feb. 9, 2023

(65) Prior Publication Data
US 2023/0314273 A1 Oct. 5, 2023

(30) Foreign Application Priority Data
Aug. 5, 2021 (CN) .......................... 202110894230.7

(51) Int. Cl.
*G01M 9/04* (2006.01)
*G01N 3/56* (2006.01)

(52) U.S. Cl.
CPC ................ *G01M 9/04* (2013.01); *G01N 3/56* (2013.01)

(58) Field of Classification Search
None
See application file for complete search history.

(56) References Cited

U.S. PATENT DOCUMENTS

2017/0008018 A1  1/2017  Gillest et al.

FOREIGN PATENT DOCUMENTS

CN      1948946 A    4/2007
CN    102042902 A    5/2011
(Continued)

OTHER PUBLICATIONS

Lu, Jiahua et al., "Aerodynamic Experimental Investigation in Blade Erosion of Gas-Solid Two-Phase Turbine", Experiments and Measurements in Fluid Mechanics, Jun. 2003, pp. 63-69, vol. 17, No. 02.
(Continued)

*Primary Examiner* — Peter J Macchiarolo
*Assistant Examiner* — Jermaine L Jenkins
(74) *Attorney, Agent, or Firm* — Bridgeway IP Law Group, PLLC; Hyun Woo Shin

(57) ABSTRACT

An ultrahigh-temperature wind tunnel erosion testing system is provided, including a fuel system (1), an erosion system (2), an erosion spray gun (3), a test piece fixture (5) and a testing device; the erosion spray gun (3) is connected with the fuel system (1) and the erosion system (2) respectively; the erosion spray gun (3) is arranged on a lifting and rotating mechanism (4); the test piece fixture (5) is arranged on one side of the lifting and rotating mechanism (4) and is opposite to a nozzle of the erosion spray gun (3); and the testing device is connected with the test piece fixture (5).

(Continued)

The plurality of groups of test pieces are circlewise arranged around the lifting and rotating mechanism (4).

12 Claims, 6 Drawing Sheets

(56) References Cited

FOREIGN PATENT DOCUMENTS

| CN | 103063534 A | 4/2013 |
|---|---|---|
| CN | 103091189 A | 5/2013 |
| CN | 207114347 U | 3/2018 |
| CN | 112326491 A | 2/2021 |
| CN | 112763308 A | 5/2021 |
| CN | 113640164 A | 11/2021 |

OTHER PUBLICATIONS

Yang, Li et al., "Research Progress in Erosion Mechanisms of Thermal Barrier Coatings", Advances in Mechanics, Nov. 25, 2012, pp. 704-721, vol. 42, No. 06.

ULTRAHIGH-TEMPERATURE WIND TUNNEL EROSION TESTING SYSTEM

CROSS-REFERENCE TO RELATED APPLICATION

This patent application claims the benefit and priority of Chinese Patent Application No. 202110894230.7, filed with the China National Intellectual Property Administration on Aug. 5, 2021, the disclosure of which is incorporated by reference herein in its entirety as part of the present application.

TECHNICAL FIELD

The present disclosure relates to the field of material performance test, more specifically to an ultrahigh-temperature wind tunnel erosion testing system.

BACKGROUND

When an aeroengine runs at a high speed, there are more fuel combustion products with large air flow, large flame flow and high temperature. These complex environments are an ultimate test for an internal hot end component of the engine. At present, a thermal barrier coating is mostly used as a key surface structural material of the internal hot end component of the engine. In an actual service process, the thermal barrier coating is in an extremely harsh and complex thermal, mechanical and chemical coupling environment, so that the thermal barrier coating may crack, fall off, be separated from an interface, or be subjected to other failures and breakages. Therefore, before an aeroengine is put into service, it is necessary to perform service environment assessment, i.e. a wind tunnel test, on the aeroengine. The wind tunnel test is extremely expensive. In order to reduce the cost, it is necessary to develop a low-cost testing system to simulate the wind tunnel test, so as to complete the material performance test on the thermal barrier coating.

Chinese patent application CN103091189A discloses a testing device for simulating a service environment of a thermal barrier coating and detecting a failure of the thermal barrier coating in real time. The testing device includes a testing platform provided with a static or dynamic rotatable sample clamping device, a service environment simulation module, a real-time detection module, a control platform, and the like. The service environment simulation module includes a high-temperature gas spray gun that can simulate high-temperature thermal fatigue, temperature gradient, erosion and corrosion of a thermal barrier coating turbine blade, an erosion particle feeding system, a corrosion service environment module and a gas transportation system. Integrated simulation of various destruction processes such as thermal fatigue, high-temperature corrosion and high-temperature erosion is realized by means of simulating a high-temperature, erosion and corrosion service environment of the thermal barrier coating turbine blade of the aeroengine.

However, the testing device in the prior art can only test one type of test pieces. If other types of test pieces are required to be tested, the previous test piece needs to be removed. In addition, in the existing testing device, an angle of an erosion spray gun and a relative position between the test pieces cannot be automatically adjusted, resulting in inconvenient operation.

SUMMARY

The present disclosure aims to provide an ultrahigh-temperature wind tunnel erosion testing system to simulate a wind tunnel test and simultaneously test the material performance of a plurality of groups of different test pieces.

In order to achieve the above objective, the present disclosure provides an ultrahigh-temperature wind tunnel erosion testing system, including: a fuel system, an erosion system, an erosion spray gun, a test piece fixture and a testing device; the erosion spray gun is connected with the fuel system and the erosion system respectively; the erosion spray gun is arranged on a lifting and rotating mechanism; the test piece fixture is arranged on one side of the lifting and rotating mechanism and is opposite to a nozzle of the erosion spray gun; the testing device is connected with the test piece fixture; the lifting and rotating mechanism includes a base and a rotary bracket fixed on the base; an outer side of the rotary bracket is sleeved with a supporting nut, a supporting spring, a guide sleeve and a transition sleeve in sequence from bottom to top; the supporting nut and the transition sleeve are both in threaded connection with the rotary bracket; the supporting spring and the guide sleeve are in sliding fit with the rotary bracket; a cantilever supporting plate is fixed on the guide sleeve; and the high-speed erosion spray gun is fixed on the cantilever supporting plate.

Further, a weight is arranged in the rotary bracket; and on the rotary bracket, the weight is connected with the cantilever supporting plate through a pulley mechanism.

Further, the pulley mechanism includes a guide wheel and a steel wire rope; the guide wheel is mounted at a top of the rotary bracket through a shaft; and two ends of the steel wire rope are respectively connected with the weight and the cantilever supporting plate.

Further, an outer side of the rotary bracket is sleeved with a connecting ring; the connecting ring is located between the supporting nut and the spring; and the connecting ring is connected with the cantilever supporting plate.

Further, a dust guard sleeves the spring and the guide sleeve, and two ends of the dust guard are respectively connected with the connecting ring and the cantilever supporting plate.

Further, a guide column is fixed on the base; a guide slot is formed in the connecting ring; and the guide column is slidably arranged in the guide slot.

Further, a rotary handle is arranged on the transition sleeve.

Further, a translational handle is arranged on the cantilever supporting plate.

Further, the test piece fixture is circlewise arranged around the lifting and rotating mechanism.

Further, the test piece fixture circlewise arranged around the lifting and rotating mechanism includes a wedge-shaped test piece, a circular test piece, a rectangular test piece and a hollow tube test piece.

Further, the ultrahigh-temperature wind tunnel erosion testing system further includes a sound insulation and noise reduction room; and the erosion spray gun, the lifting and rotating mechanism, the test piece fixture and the testing device are located in the sound insulation and noise reduction room.

Further, the erosion spray gun is internally provided with a laval nozzle structure.

Compared with the prior art, the present disclosure achieves the following beneficial technical effects:

In the ultrahigh-temperature wind tunnel erosion testing system of the present disclosure, the lifting and rotating mechanism is provided, and the plurality of groups of test pieces are circlewise arranged around the lifting and rotating mechanism. The lifting and rotating mechanism drives the high-speed erosion spray gun to be lifted or rotate, so that the angle of the spray gun and the relative position between the different test pieces can be adjusted, and the erosion performance of the plurality of groups of test pieces can be simultaneously tested; and the operation is convenient.

DETAILED DESCRIPTION OF THE EMBODIMENTS

The preferred embodiments of the present disclosure are provided below with reference to the accompanying drawings, and are described in detail.

Figure 1:
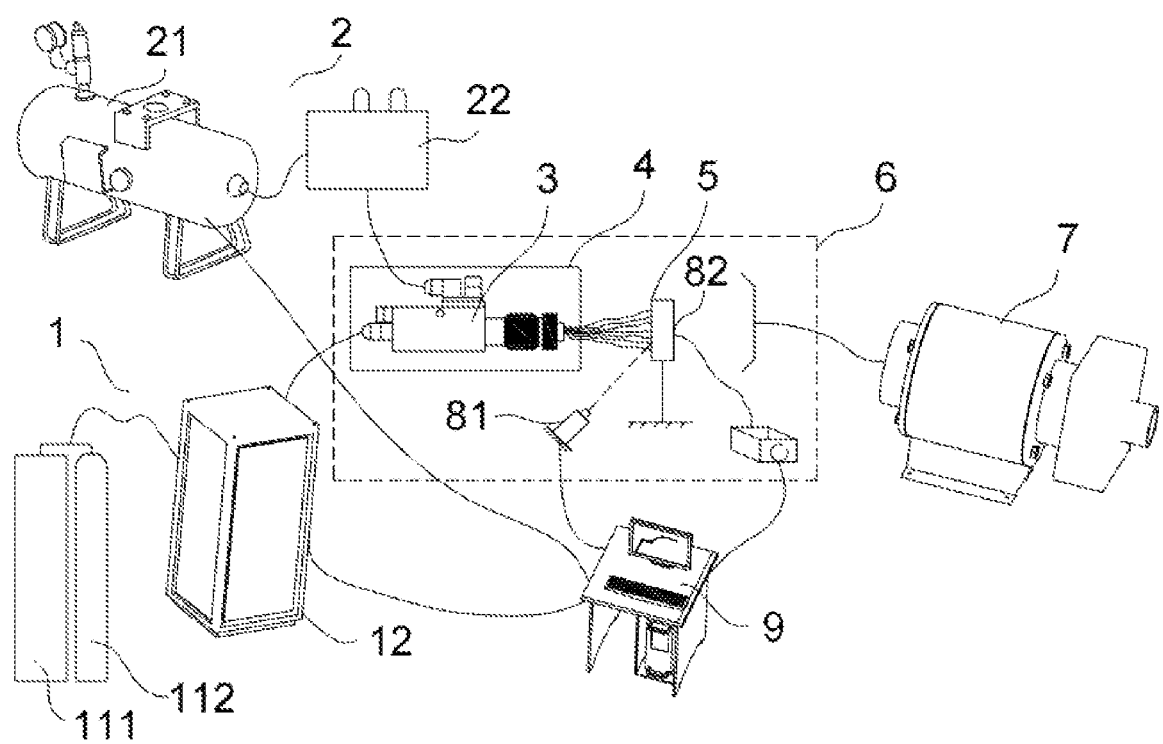
FIG. 1 is a schematic structural diagram of an ultrahigh-temperature wind tunnel erosion testing system provided by an embodiment of the present disclosure.

As shown in FIG. 1, an embodiment of the present disclosure provides an ultrahigh-temperature wind tunnel erosion testing system, including a fuel system 1, an erosion system 2, a high-speed erosion spray gun 3, a lifting and rotating mechanism 4, a test piece fixture 5 and a testing device (not shown in the figures). The fuel system 1 and the erosion system 2 are respectively connected with the high-speed erosion spray gun 3. The high-speed erosion spray gun 3 is fixed on the lifting and rotating mechanism 4. The lifting and rotating mechanism 4 can drive the high-speed erosion spray gun 3 to move up and down as well as left and right. The test piece fixture 5 is located on one side of the high-speed erosion spray gun 3 and is aligned with a sprayer head of the high-speed erosion spray gun 3. The testing device is used for testing the material performance of the test piece fixture. The fuel system 1 is combusted to generate high temperature. The high-speed erosion spray gun 3 is used to form high-speed flame flow. The erosion system 2 delivers erosion particles through the high-speed erosion spray gun 3, and the erosion particles are combined with the flame flow to form high-temperature high-speed erosion particles prayed to the test piece fixture 5, thus simulating a real service environment of an aeroengine. The testing device tests the material performance of the test piece fixture 5, thus obtaining a testing result of a test piece under the service environment.

The testing device can adopt a testing machine for the mechanical properties of a material, thus achieving a material performance test under the combined action of a complex mechanical load and high-temperature high-speed erosion.

The fuel system 1 includes a first storage tank 111, a second storage tank 112 and a gas path control device 12. The first storage tank 111 stores fuel. The second storage tank 112 stores liquid oxygen. The first storage tank 111 and the second storage tank 112 are connected with the high-speed erosion spray gun 3 through the gas path control device 12, so that the fuel and the liquid oxygen enter the high-speed erosion spray gun 3 and are combusted in the high-speed erosion spray gun to form the high-temperature flame flow. The gas path control device 12 can control the volumes of the fuel and liquid oxygen entering the high-speed erosion spray gun 3, thus achieving accurate control of a temperature. An ultrahigh temperature of 2000° C. or above can be achieved through the fuel system 1.

Specifically, the first storage tank 111 and the second storage tank 112 are provided with valves (not shown in the figure). The gas path control device 12 controls the valves to adjust the temperature. Preferably, the valves have adjustable opening degrees, thus achieving accurate control of temperature.

The erosion system 2 includes a gas source 21 and an erosion particle device 22 which communicate with each other. The erosion particle device 22 is connected with the high-speed erosion spray gun 3. The erosion particle device 22 stores erosion particles, and can calculate and adjust the number of particles. The erosion particles can be particulate matters of aluminum oxide, zirconium oxide or the like, which are not melted at this temperature. High-pressure gas generated by the gas source 21 pushes the erosion particles inside the erosion particle device 22 into the high-speed erosion spray gun 3, and the erosion particles are combined with the high-temperature flame flow to form the high-temperature high-speed erosion particles. In order to accurately measure and control the number of particles, a filter (not shown in the figures) is arranged between the high-speed erosion spray gun 3 and the erosion particle device 22. An observable instrument is arranged inside the erosion particle device 22 to observe parameters such as an intake pressure of transportation and a gas transportation flow rate.

The high-speed erosion spray gun 3 is internally provided with a laval nozzle structure, so that a gas flow passing by can change from a subsonic speed to a sound speed and is even accelerated to a supersonic speed, and the sprayer head can be replaced according to a test requirement to achieve speed adjustment. By means of the laval nozzle structure, this embodiment can achieve a high speed of 6.5 Mach If the speed is greater than the sound speed, larger noise will be caused. In order to reduce the noise impact, in this embodiment of the present disclosure, the high-speed erosion spray gun 3, the lifting and rotating mechanism 4, the test piece fixture 5 and the testing device are arranged in one sound insulation and noise reduction room 6.

In one embodiment, the ultrahigh-temperature wind tunnel erosion testing system further includes a heat discharging device 7, arranged outside the sound insulation and noise reduction room 6 and having one end (a heat discharging end) extending into one side, far from the high-speed erosion spray gun 3, of the test piece fixture 5 in the sound insulation and noise reduction room 6 to transport waste heat generated by the high-temperature combustion of the fuel out of the room, thus avoiding thermal erosion to the entire device caused by the heat and particulate dust in the test.

A non-contact temperature measuring device 81 and a thermocouple 82 are also arranged in the sound insulation and noise reduction room 6. The non-contact temperature measuring device 81 is used for measuring a temperature of one side (the front side) of the test piece fixture 5 close to the high-speed erosion spray gun 3. The thermocouple 82 is arranged on the side of the test piece fixture 5 far from the high-speed erosion spray gun 3 and is used for measuring a temperature of the other side (the back side) of the test piece fixture 5. A temperature comparison test is carried out on the two temperatures. The non-contact temperature measuring device 81 can adopt a photoelectrical colorimeter.

A control device 9 is also arranged outside the sound insulation and noise reduction room 6, and is connected with the fuel system 1, the erosion system 2, the non-contact temperature measuring device 81 and the thermocouple 82 respectively. When an actual temperature of the test piece fixture 5 is greater than or less than a set temperature, the temperature of the test piece fixture 5 is adjusted by means of adjusting the volumes of the fuel and the liquid oxygen in the fuel system 1.

The control device 9 can also be configured to collect testing information in a testing process and store the testing information for reading and analysis of data. The testing information includes erosion temperature and time, temperatures of front and back surfaces of the test piece, a difference between the temperature of the front surface and the temperature of the back surface, and the like. In one feasible implementation, the control device 9 is a computer.

Figure 2:
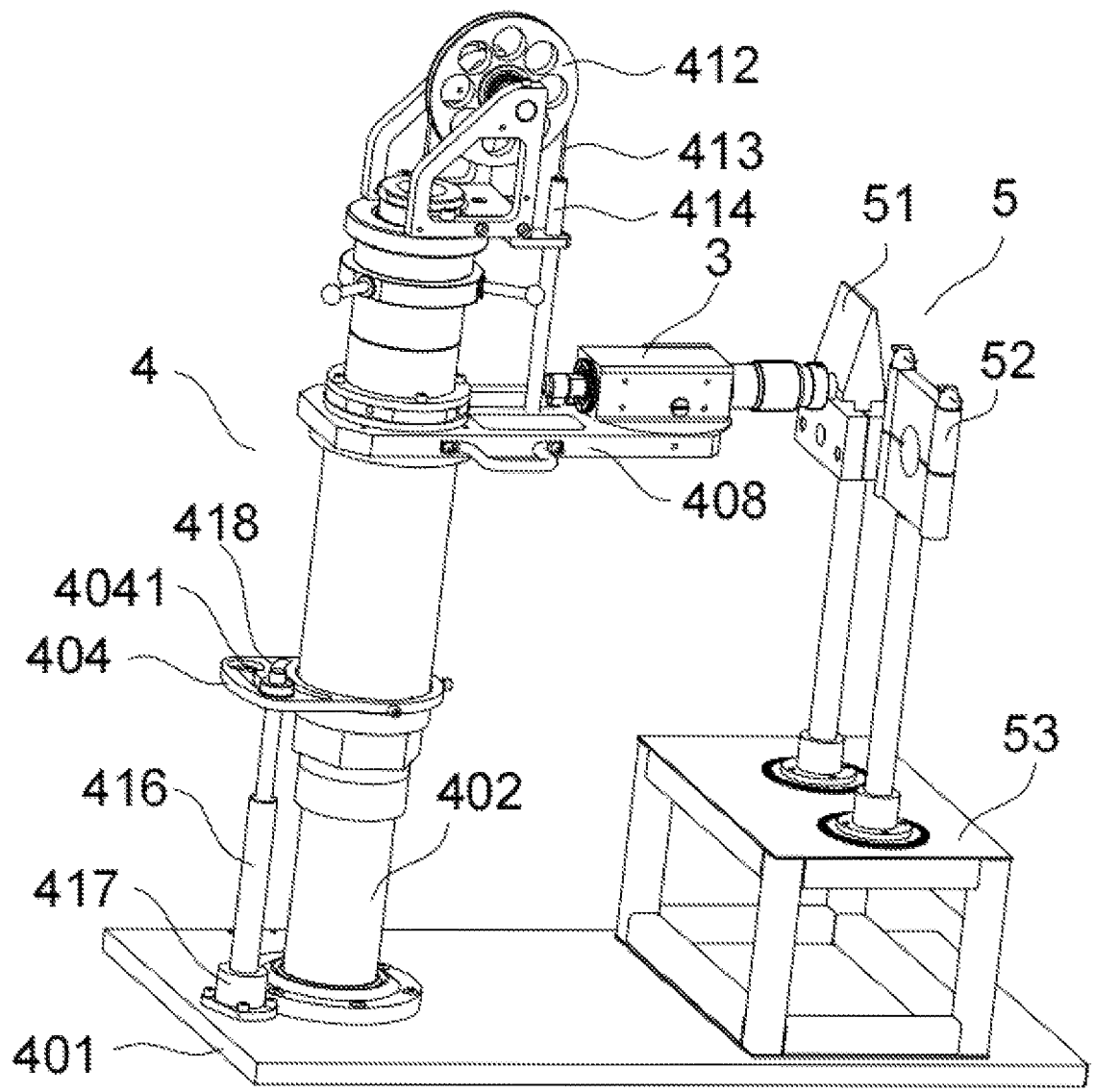
FIG. 2 is a schematic structural diagram of a high-speed erosion spray gun, a lifting and rotating mechanism and a test piece fixture of the ultrahigh-temperature wind tunnel erosion testing system provided by an embodiment of the present disclosure.

As shown in FIG. 2, the test piece fixture 5 includes a wedge-shaped test piece fixture 51, a circular test piece fixture 52 and a bracket 53. The wedge-shaped test piece fixture 51 and the circular test piece fixture 52 are both arranged on the bracket 53. The high-speed erosion spray gun 3 sprays the high-temperature high-speed erosion particles to the wedge-shaped test piece fixture 51 or the circular test piece fixture 52 to make the fixture in a high-temperature erosion environment.

Figure 3:
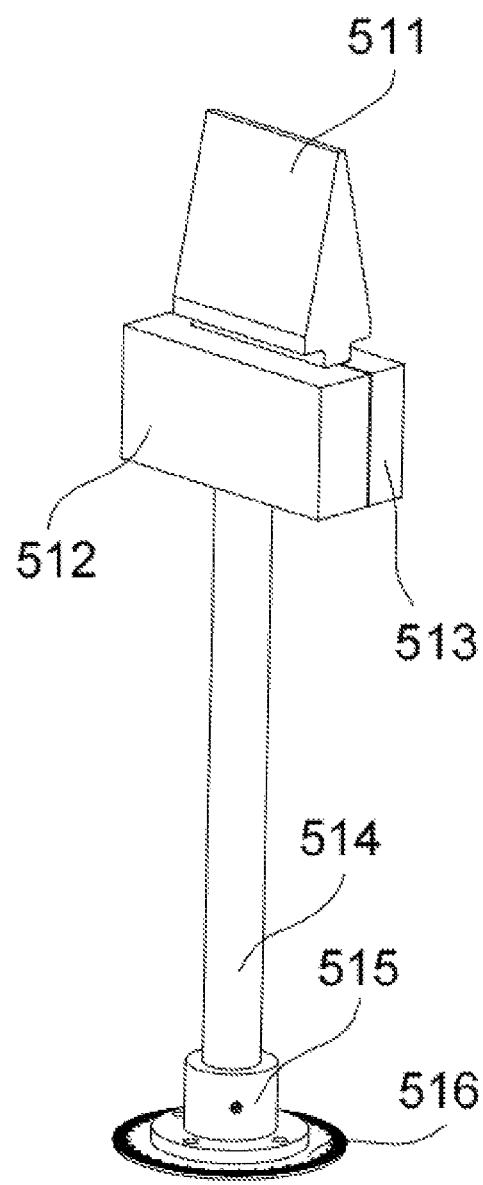
FIG. 3 is a schematic structural diagram of a wedge-shaped test piece of the ultrahigh-temperature wind tunnel erosion testing system provided by an embodiment of the present disclosure.

As shown in FIG. 3, the wedge-shaped test piece fixture 51 includes a wedge-shaped test piece 511, a left chuck 512, a right chuck 513, a supporting column 514, a clamp sleeve 515 and a scale plate 516; the scale plate 516 is fixed on the bracket 53; the supporting column 514 is mounted on the scale plate 516 through the clamp sleeve 515; the clamp sleeve 515 is fixed on the scale plate 516; the supporting column 514 rotates in the clamp sleeve 515; the left chuck 512 and the right chuck 513 are fixed on the supporting column 514; and the wedge-shaped test piece 511 is clamped between the left chuck 512 and the right chuck 513. The scale plate 516 is used for marking angles. The wedge-shaped test piece 511 can rotate to any angle according to a requirement, thus simulating rotation of a blade of an aeroengine during working.

Figure 4:
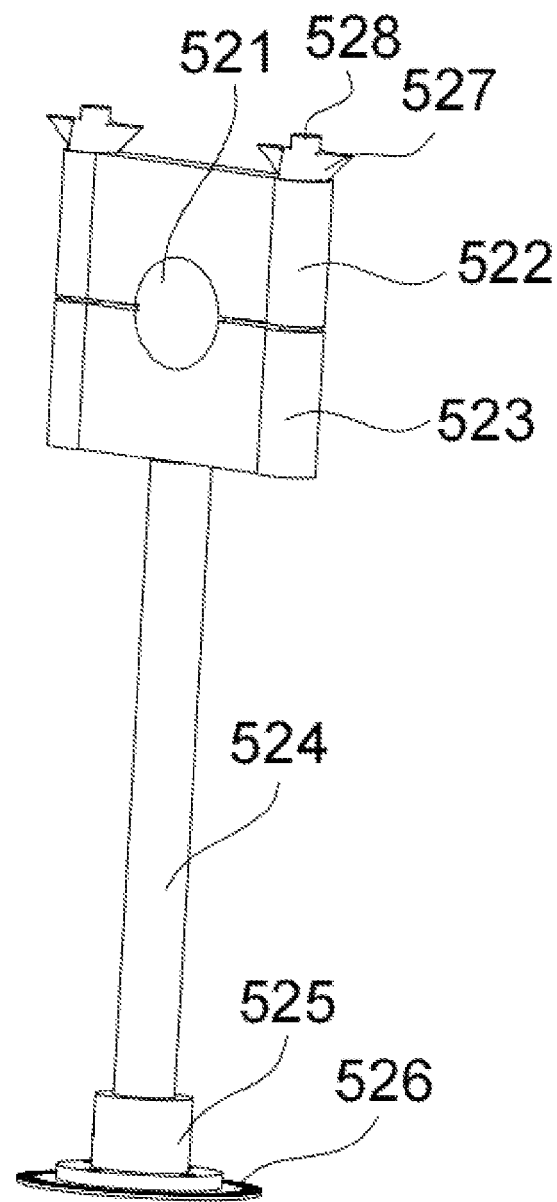
FIG. 4 is a schematic structural diagram of a circular test piece of the ultrahigh-temperature wind tunnel erosion testing system provided by an embodiment of the present disclosure.

As shown in FIG. 4, the circular test piece fixture 52 includes a circular test piece 521, an upper chuck 522, a lower chuck 523, a supporting column 524, a clamp sleeve 525 and a scale plate 526; the scale plate 526 is fixed on the bracket 53; the supporting column 524 is mounted on the scale plate 526 through the clamp sleeve 525; the lower chuck 523 is fixed on the supporting column 524; the circular test piece 521 is clamped between the upper chuck 522 and the lower chuck 523; and the upper chuck 522 is fixed with the lower chuck 523 through a nut 527 and a stud 528. Similarly, the circular test piece 521 can also rotate to any angle according to a requirement.

When the wedge-shaped test piece 511 or the circular test piece 521 is eroded to a set temperature, the testing device tests the material performance of the test piece, thus obtaining testing data of the test piece under the high-temperature erosion environment.

A material of the test piece may be a metal material, a non-metal material or a metal and non-metal combined material.

It can be understood that the test piece fixture 5 can also include a rectangular test piece fixture, a hollow tube test piece fixture, or test piece fixtures of other shapes according to a requirement, so as to realize a material erosion performance test on a plurality of groups of test pieces.

Figure 5:
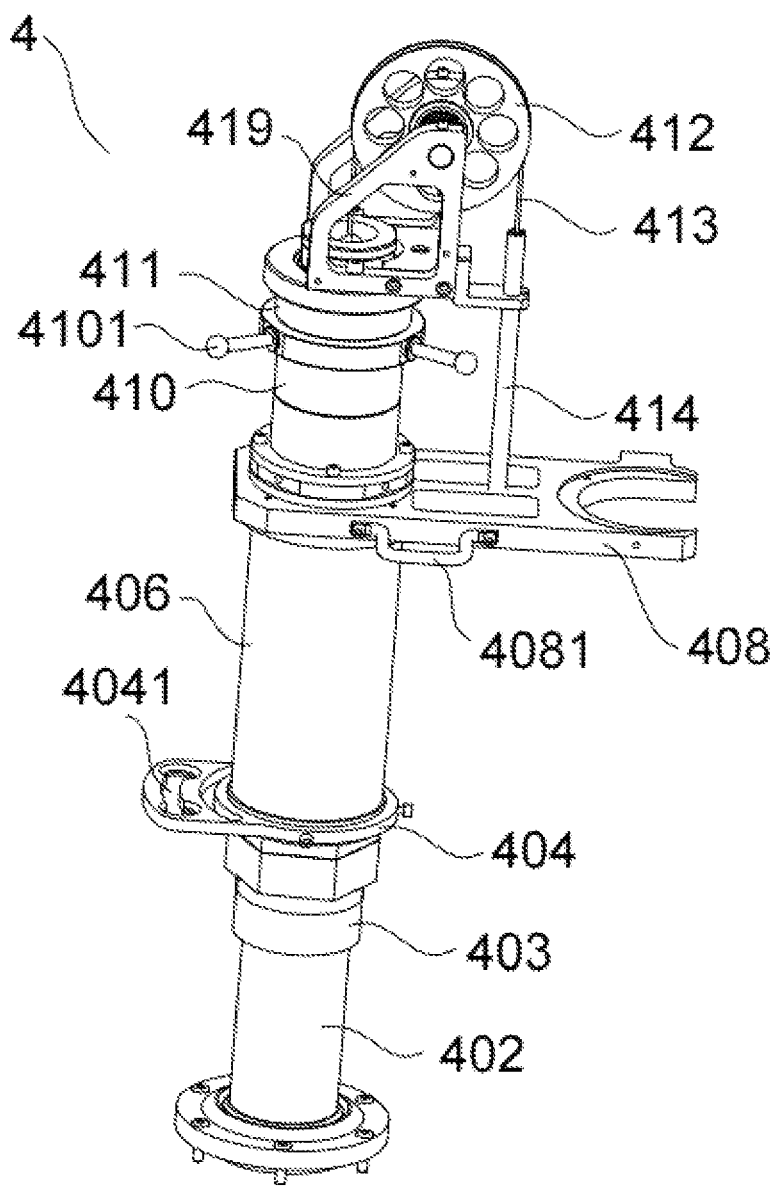
FIG. 5 is a schematic structural diagram of the lifting and rotating mechanism of the ultrahigh-temperature wind tunnel erosion testing system provided by an embodiment of the present disclosure.
Figure 6:
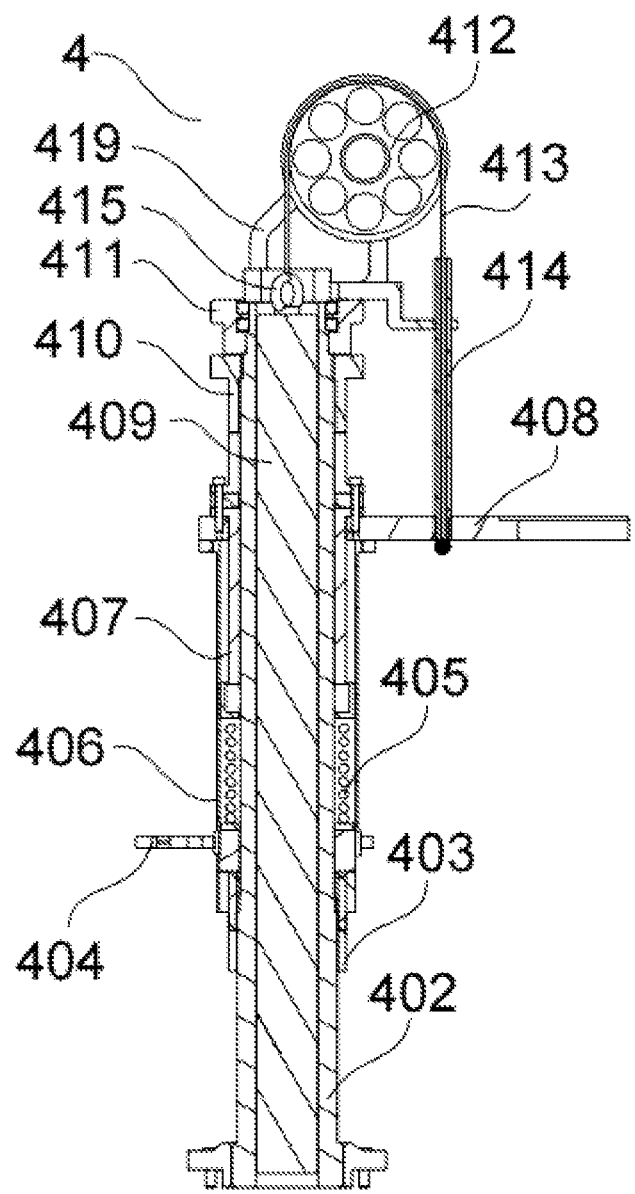
FIG. 6 is a front view of FIG. 5.

As shown in FIG. 2, FIG. 5 and FIG. 6, the lifting and rotating mechanism 4 includes a base 401 and a rotary bracket 402 arranged on the base 401. The rotary bracket 402 can be fixed on the base 401 through a screw and is used for providing a force bearing framework of the entire lifting and rotating mechanism 4.

An outer side of the rotary bracket 402 is sleeved with a supporting nut 403, a connecting ring 404, a supporting spring 405, a guide sleeve 407, a transition sleeve 410 and a top cover 411 in sequence from bottom to top. The supporting nut 403 and the rotary bracket 402 are in threaded connection. The connecting ring 404, the supporting spring 405 and the guide sleeve 407 can rotate around the rotary bracket 402 and move up and down along the rotary bracket 402. The transition sleeve 410 and the rotary bracket 402 are in threaded connection. The top cover 411 is connected with the rotary bracket 402 through a bearing, so that the top cover can rotate around the rotary bracket 402. A cantilever supporting plate 408 is fixed on an outer side of the guide sleeve 407 through a screw. A rotary sleeve 414 is fixed on the cantilever supporting plate 408. A mounting frame 419 is arranged on the top cover 411. The guide wheel 412 is mounted on the mounting frame 419 through a shaft, and thus can rotate around the shaft. A weight 409 is arranged inside the rotary bracket 402. A hanging ring 415 is arranged on the weight 409. A steel wire rope 413 is wound on the guide wheel 412. Two ends of the steel wire rope 413 are respectively connected with the hanging ring 415 and the rotary sleeve 414. That is, the weight 409 is connected with the cantilever supporting plate 408 through a pulley mechanism.

The high-speed erosion spray gun 3 is fixed at one end of the cantilever supporting plate 408. The weight of the weight 409 is equal to the weight of the cantilever supporting plate 408 and the weight of the high-speed erosion spray gun 3 to counteract the impact of the weight. In this way, the weight 409 achieves a balance state with the cantilever supporting plate 408 and the high-speed erosion spray gun 3. The cantilever supporting plate 408 can move up or down by means of applying a tiny force to it.

The transition sleeve 410 is provided with a rotary handle 4101. The transition sleeve 410 can be tightened or loosened by means of the rotary handle 4104, so as to rotate around the rotary bracket 402 and move up and down.

A translational handle 4081 is arranged on the cantilever supporting plate 408. The cantilever supporting plate 408 and the guide sleeve 407 can be pushed by the translational handle 4081 to rotate around the rotary bracket 402.

The supporting spring 405 is in a compressed state, and two ends are in contact with the connecting ring 404 and the guide sleeve 407 respectively to help the cantilever supporting plate 408 to be lifted. A dust guard 406 sleeves the supporting spring 405 and the guide sleeve 407 and is used for protecting the supporting spring 405 and keeping it clean. An upper end and a lower end of the dust guard 406 are respectively fixedly connected with the cantilever supporting plate 408 and the connecting ring 404. In this way, the cantilever supporting plate 408, the dust guard 406 and the connecting ring 404 can synchronously rotate.

The lifting and rotating mechanism 4 further includes a guide column 416, a locking sleeve 417 and a locking nut 418. The guide column 416 is fixed on the base 401 through the locking sleeve 417. A guide slot 4041 is arranged on the connecting ring 404. One end of the guide column 416 passes through the guide slot 4041 and can slide in the guide slot 4041. When the connecting ring 404 rotates to a certain position, the locking nut 418 locks an upper end of the guide column 416 to the connecting ring 404, thus limiting the position of the connecting ring 404 and making the connecting ring not rotate again.

The working principle of the lifting and rotating mechanism of the present disclosure is as follows:

When the transition sleeve 410 is tightened by means of the rotary handle 4101, the transition sleeve 410 will rotate. A downward force is applied to the cantilever supporting plate 408, so that the cantilever supporting plate 408 and the guide sleeve 407 move down and press the spring 406. Therefore, the cantilever supporting plate 408 and the high-speed erosion spray gun 3 go down. When the transition sleeve 410 is loosened by the rotary handle 4101, the transition sleeve 410 moves up. At this time, under the action of a compressing force of the spring 406, the guide sleeve 407 and the cantilever supporting plate 408 will move up, so as to lift the high-speed erosion spray gun 3. Therefore, the high-speed erosion spray gun can be lifted or dropped by means of the rotary handle 4104.

The translational handle 4081 pushes the cantilever supporting plate 408 to rotate. The cantilever supporting plate 408 drives the rotary sleeve 414, the mounting frame 419, the guide wheel 412 and the high-speed erosion spray gun 3 to synchronously rotate, so that the high-speed erosion spray gun 3 rotates in a horizontal plane. Meanwhile, the cantilever supporting plate 408 will drive the dust guard 406 and the connecting ring 404 to rotate, thus making the guide column 416 to slide in the guide slot 4041. When the guide column slides to two ends of the guide slot 4041, the connecting ring 404 will be stopped by the guide column 416 and cannot continue to rotate. In this way, the cantilever supporting plate 408 cannot continue to rotate, either, thus limiting a maximum rotating angle of the high-speed erosion spray gun 3. Therefore, the two ends of the guide slot 4041 limit a rotating range of the high-speed erosion spray gun 3. When the high-speed erosion spray gun 3 rotates within the rotating range, the guide column 416 can be locked at any position through the locking nut 418, so that the high-speed erosion spray gun 3 is fixed at a certain specific angle. Therefore, the high-speed erosion spray gun 3 can rotate in the horizontal plane by means of rotating the translational handle 4081.

It should be noted that the above entire operation process can be completed by a robot, thus realizing automatic operations.

The bracket 53 can be mounted on the base 401, and the wedge-shaped test piece fixture 51, the circular test piece fixture and other types of test piece fixtures on the bracket can be arranged around the lifting and rotating mechanism 4, so that the high-speed erosion spray gun 3 can perform high-temperature high-speed erosion on different types of test pieces according to a requirement, thus carrying out a material erosion performance test on a plurality of groups of test pieces.

In the ultrahigh-temperature wind tunnel erosion testing system provided by this embodiment of the present disclosure, the plurality of groups of test pieces are circlewise arranged around the lifting and rotating mechanism 4. The lifting and rotating mechanism 4 drives the high-speed erosion spray gun 3 to be lifted or rotate, so that the angle of the spray gun and the relative position between the different test pieces can be adjusted, and the erosion performance of the plurality of groups of test pieces can be simultaneously tested; and the operation is convenient.

The above is only preferred embodiments of the present disclosure, and is not intended to limit the scope of the present disclosure. Various changes can also be made to the above embodiments of the present disclosure. That is, all simple and equivalent changes and modifications that are made according to the claims of the application of the present disclosure and the content of the description shall fall within the protection scope of the claims of the patent of the present disclosure. The undescribed parts of the present disclosure are general technical contents.

What is claimed is:

1. An ultrahigh-temperature wind tunnel erosion testing system, comprising a fuel system, an erosion system, an erosion spray gun, a test piece fixture and a testing device, wherein the erosion spray gun is connected with the fuel system and the erosion system respectively; the erosion spray gun is arranged on a lifting and rotating mechanism; the test piece fixture is arranged on one side of the lifting and rotating mechanism and is opposite to a nozzle of the erosion spray gun; the testing device is connected with the test piece fixture; the lifting and rotating mechanism comprises a base and a rotary bracket fixed on the base; an outer side of the rotary bracket is sleeved with a supporting nut, a supporting spring, a guide sleeve and a transition sleeve in sequence from bottom to top; the supporting nut and the transition sleeve are both in threaded connection with the rotary bracket; the supporting spring and the guide sleeve are in sliding fit with the rotary bracket; a cantilever supporting plate is fixed on the guide sleeve; and the erosion spray gun is fixed on the cantilever supporting plate.

2. The ultrahigh-temperature wind tunnel erosion testing system according to claim 1, wherein a weight is arranged in the rotary bracket; and on the rotary bracket, the weight is connected with the cantilever supporting plate through a pulley mechanism.

3. The ultrahigh-temperature wind tunnel erosion testing system according to claim 2, wherein the pulley mechanism comprises a guide wheel and a steel wire rope; the guide wheel is mounted at a top of the rotary bracket through a shaft; and two ends of the steel wire rope are respectively connected with the weight and the cantilever supporting plate.

4. The ultrahigh-temperature wind tunnel erosion testing system according to claim 1, wherein an outer side of the rotary bracket is sleeved with a connecting ring; the connecting ring is located between the supporting nut and the spring; and the connecting ring is connected with the cantilever supporting plate.

5. The ultrahigh-temperature wind tunnel erosion testing system according to claim 4, wherein a dust guard sleeves the spring and the guide sleeve, and two ends of the dust guard are respectively connected with the connecting ring and the cantilever supporting plate.

6. The ultrahigh-temperature wind tunnel erosion testing system according to claim 4, wherein a guide column is fixed on the base; a guide slot is formed in the connecting ring; and the guide column is slidably arranged in the guide slot.

7. The ultrahigh-temperature wind tunnel erosion testing system according to claim 1, wherein a rotary handle is arranged on the transition sleeve.

8. The ultrahigh-temperature wind tunnel erosion testing system according to claim 1, wherein a translational handle is arranged on the cantilever supporting plate.

9. The ultrahigh-temperature wind tunnel erosion testing system according to claim 1, wherein the test piece fixture is circlewise arranged around the lifting and rotating mechanism.

10. The ultrahigh-temperature wind tunnel erosion testing system according to claim 9, wherein the test piece fixture circlewise arranged around the lifting and rotating mechanism comprises a wedge-shaped test piece, a circular test piece, a rectangular test piece and a hollow tube test piece.

11. The ultrahigh-temperature wind tunnel erosion testing system according to claim 1, further comprising a sound insulation and noise reduction room, wherein the erosion spray gun, the lifting and rotating mechanism, the test piece fixture and the testing device are located in the sound insulation and noise reduction room.

12. The ultrahigh-temperature wind tunnel erosion testing system according to claim 1, wherein the erosion spray gun is internally provided with a laval nozzle structure.

* * * * *